United States Patent [19]

Riggs

[11] 3,980,173

[45] Sept. 14, 1976

[54] PRECISION MOVING PLATFORM

[75] Inventor: Darius O. Riggs, Ottawa Lake, Mich.

[73] Assignee: Owens-Illinois, Inc., Toledo, Ohio

[22] Filed: Oct. 2, 1975

[21] Appl. No.: 618,878

[52] U.S. Cl. .............................. 198/339; 198/805; 74/245 C; 74/245 S
[51] Int. Cl.² ........................................ B65G 17/00
[58] Field of Search ............ 198/41, 193, 194, 202, 198/204, 189, 110, 195, 184; 74/245 R, 245 C, 245 S, 248, 249, 251 R, 251 C, 251 S, 258; 209/111.7

[56] References Cited
UNITED STATES PATENTS

| | | | |
|---|---|---|---|
| 2,355,448 | 8/1944 | Kratz | 198/202 |
| 2,653,485 | 9/1953 | MacArthur | 74/253 S |
| 3,481,467 | 12/1969 | Wood | 209/111.7 |
| 3,581,873 | 6/1971 | Spodig | 198/41 |
| 3,656,361 | 4/1972 | Honda | 74/245 S |

*Primary Examiner*—Evon C. Blunk
*Assistant Examiner*—Joseph E. Valenza
*Attorney, Agent, or Firm*—S. M. McLary; E. J. Holler

[57] ABSTRACT

A stable moving platform from which articles may be measured while in motion on this platform. An endless, moving silent chain type conveyor is modified to allow a center group of links to float relative to the pins which hold the links together. A mechanical force applying means presses the chain downward to define fixed horizontal and vertical planes just as the chain is to enter an inspection zone. A magnetic force applying means under the chains holds the chain in the fixed position defined by the mechanical force applying means as the chain moves through the inspection zone.

7 Claims, 10 Drawing Figures

PRECISION MOVING PLATFORM

BACKGROUND OF THE INVENTION

This invention generally relates to an article transport system. More particularly, this invention relates to an article transport system in which the article is inspected for certain attributes as it is being transported. Specifically, this invention relates to a modified type of silent chain in which a center group of links may float relative to their assembly pins and wherein the links are held in a fixed location by a magnetic field in an inspection zone.

The basic purpose of the present invention is to provide a stable moving platform from which articles may be measured, while in motion on this platform, with accuracy and repeatability. The basic component of the present invention is a modified type of silent chain. The term "silent chain" is one which is well recognized in the mechanical arts, and describes a particular type of chain. An example of silent chain may be seen in Chapter 8 of *The Standard Handbook For Mechanical Engineers* by Bauneister and Marks. Basically, this type of chain is made up of a plurality of links, extending both longitudinally and transversely, which are held together with pins. The primary advantage of this particular type of chain is that chordal action is very much reduced. Chordal action is a variation in chain velocity which is due to a sprocket being a polygon as opposed to a cylinder of constant radius. Ordinary roller chain is subject to repeated variations in chain velocity as it is transported around sprockets. This variation in velocity makes it very difficult, if not impossible, to use conventional roller chain to provide a stable moving platform. As is known in the art, two pins normally hold a section of silent chain together and are allowed to move or roll relative to one another as the chain flexes to engage a sprocket. In so doing, the pins function as cams and cause a slight increase and a slight decrease in the pitch of each length as it engages the sprocket. This then allows compensation for the otherwise unavoidable velocity variations as the chain is moved around the sprocket. There are many variations in the types of pin used to hold the silent chain together. For example, both pins may be free to move relative to one another, or one of the pins may be fixed in position while the other pin rolls relative to that pin. Whatever the case, the basic principle involved is the same. Namely, there is relative motion of the pins which hold the links together in order to compensate for chordal action. Because of this ability of silent chain to compensate for chordal action, it is possible to have a very smooth running chain with minor variations in velocity. This would seem to allow use of such a chain as a stable moving platform from which measurements could be made. However, the conventional manufacturing tolerances are such that there are minor variations of a few thousandths of an inch from side to side and end to end in any section of silent chain. That is, the difference from side to side of a silent chain of six to eight inches in width may be several thousandths of an inch. Such a variation is of no concern in normal drive usage, but does create a problem when an article is to be measured to an accuracy of a few thousandths of an inch while it is moving on the chain. The present invention presents a solution to this situation and achieves a stable moving platform. This result is achieved by providing clearance between the assembly pins and the holes in a group of center links. These links are then pressed down to a fixed location and held there by a magnetic field as the chain transports articles through an inspection zone.

SUMMARY OF THE INVENTION

My invention resides in an apparatus for providing a dimensionally stable, moving platform for the inspection of articles being moved by the apparatus. The invention includes a modified endless silent chain of the type having a plurality of longitudinal and transverse links. The chain is held together by a plurality of pairs of pins which extend transversely through common openings in the links to hold adjacent links together. The chain is modified to allow vertical and longitudinal movement of a center group of links relative to the pins while the outer most links are held in fixed positional contact with the pins. The endless chain is trained over two spaced apart, rotatably mounted sprockets. One of the sprockets is rotated by a drive means. A magnetic force applying means is positioned under the chain between the sprockets. This holds the center group of links in common horizontal and vertical planes. A mechanical force applying means presses the chain downward at the beginning of the inspection zone to insure that all of the center group of links are held by the magnetic force applying means.

DETAILED DESCRIPTION OF THE DRAWINGS

Figure 1:
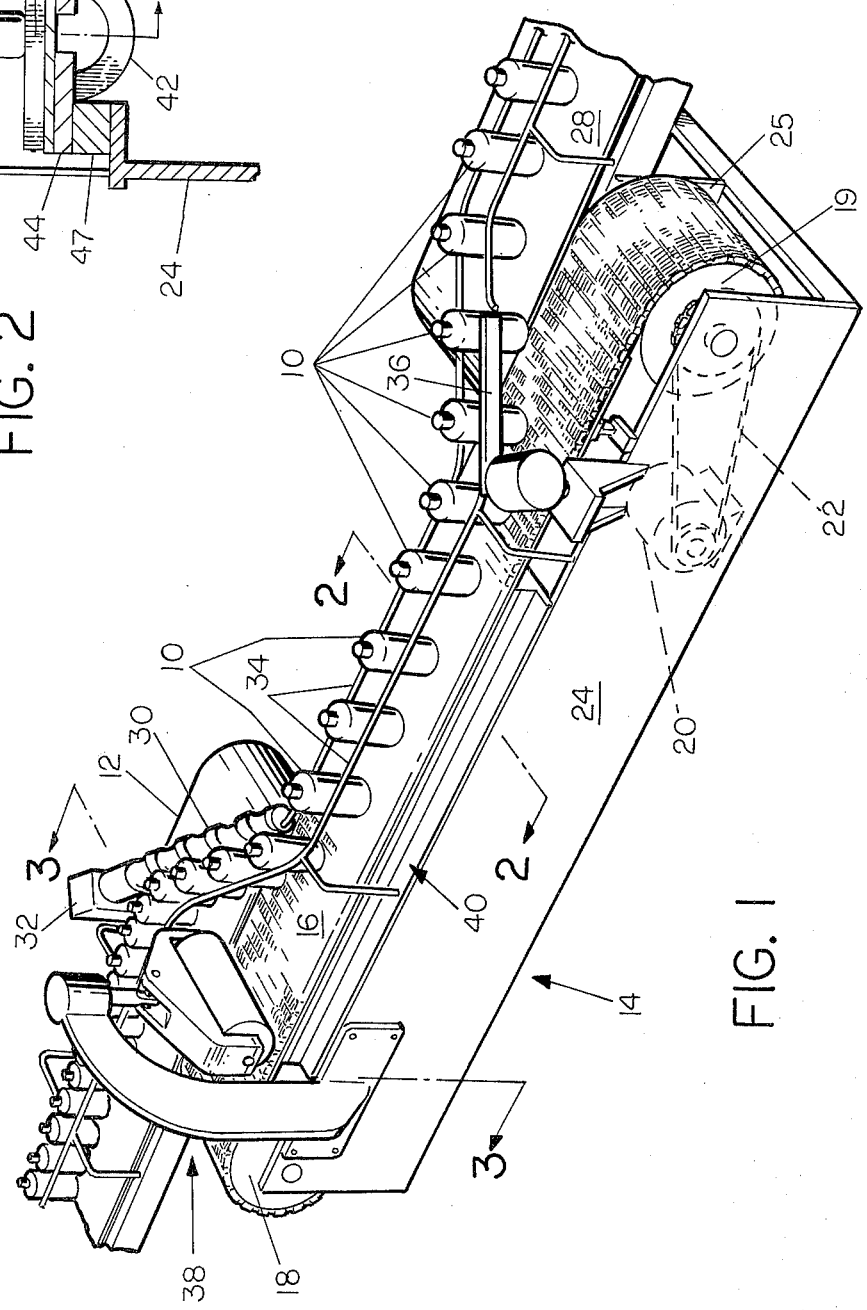
FIG. 1 is a perspective view of the present invention generally in its operational environment.

FIG. 1 shows the present invention in its general operational configuration, with the actual measurement apparatus removed to allow better understanding of the present invention itself. In FIG. 1, the articles being inspected are a plurality of glass containers 10 which are presented in a single file. The glass containers 10 may be inspected for certain attributes such as diameter, height and concentricity of the top portion with the bottom portion by an inspection apparatus such as that shown in U.S. Pat. No. 3,549,890. This device may be used with reasonable accuracy on a conventional conveying line, but to realize its full potential, should be used with a precision measuring surface such as that which is the subject of the present invention. The glass containers 10 are presented on a continuously moving endless conveyor 12. The conveyor 12 may be considered to be an infeed conveyor which furnishes the glass containers 10 to the transport system 14 of the present invention. The transport system of the present invention includes a section of modified silent chain 16. The modified silent chain 16 is formed into an endless loop and is trained around sprockets 18 and 19. The sprocket 19 is driven by a drive motor 20 with a drive member 22 connecting the drive motor 20 and the sprocket 19. The sprockets 18 and 19 are rotatably journaled in side members 24 and 25. The side member 24 may be sized such that it sits on the floor of an area in which this apparatus is used. The sidemember 25 is somewhat shorter and is preferably designed to connect to side rails of the infeed conveyor 12 and an output conveyor 28 which is designed to remove the glass containers 10 from the transport system 14 after they have been inspected. The glass containers 10 may be spaced for inspection as they enter the transport system 14 by a conventional article spacing helix 30 which may be driven through a gear box 32. Appropriate guide rails 34 may be used to hold the glass containers 10 in a particular location as they are moved to and through the transport system 14. If a glass container 10 is found to be defective in one or more aspects during its inspection, a rejection arm 36 may be raised which allows the glass container 10 to proceed along the moving silent chain 16 for discard. As will be shown in the drawing figures to follow, the silent chain 16 has been modified such that the inner links of the chain 16 are free to float or move slightly with respect to the outermost links. It has been found that if the outermost three-fourths to seven-eighths of an inch in width of the chain 16 is maintained in the standard or normal configuration, any loads experienced in this type of operation may be safely carried by this relatively small portion of the total width of the chain 16. The remainder of the width of the chain 16 has been modified so that the links may move a few thousandths of an inch relative to these outer links. It is this ability to move or float that allows the creation of a moving, stable and dimensionally accurate measurement platform. The direction of movement of the silent chain 16 in FIG. 1 is from left to right. As the chain 16 comes around the sprocket 18, moving in the direction of the flow of the glass containers 10, the chain 16 is pressed downward by a mechanical force applying means 38. The purpose of the force applying means 38 is to press all of the links of the silent chain 16 downward to a common and well defined lower most point. Since the center links are free to move, they will respond to this force and move downward to this locational point. The chain 16 remains in this position through the action of a magnetic force applying means generally designated by the numeral 40. The magnetic force applying means 40 extends along a fixed length of the transport system 14 and defines the area in which the chain 16 is held in such a location, or in such a configuration, as to present a dimensionally accurate and flat surface from which measurements of the glass containers 10 may be made. The chain in this area is held in a common horizontal and vertical plane. As an example, the dimensional stability of the chain 16 in the area of the magnetic force applying means 40 has been found to be plus or minus two-thousandths of an inch from side to side and plus or minus two-thousandths of an inch from end to end. Conventional silent chain is unable to provide dimensional accuracy of this magnitude because of dimensional variations. It is therefore quite important that the links be able to float relative to one another and be held in a precise and known location by the magnetic force applying means 40.

Figure 2:
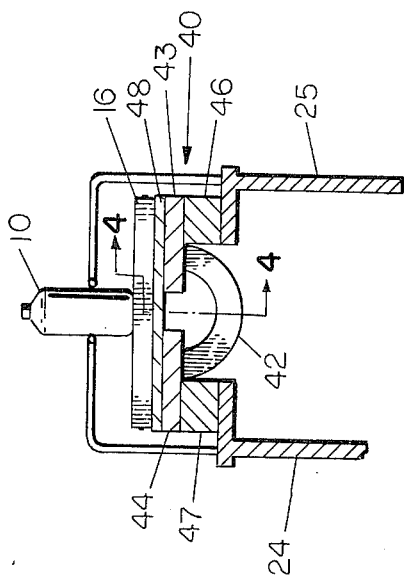
FIG. 2 is a cross sectional view taken along the line 2—2 of FIG. 1.

FIG. 2 illustrates in greater detail and with more clarity the precise makeup of the magnetic force supplying means 40. In this particular instance, and by way of example only, a plurality of horseshoe magnets 42 having a relatively strong magnetic force are connected to separate pole pieces 43 and 44. These magnets have north and south poles. One pole of all the magnets 42 is in contact with the pole piece 43 and the other pole of all the magnets 42 is in contact with the other pole piece 44. The pole pieces 43 and 44 are used to spread and distribute the magnetic flux or field of the plurality of horseshoe magnets 42. The chain 16 furnishes the path to complete magnetic field. The pole pieces 43 and 44 are actually mounted on top of spacer blocks 46 and 47 which are mounted atop extensions of the side members 24 and 25. This precise configuration is not particularly critical, since there are optional methods of mounting the magnets, and, additionally, optional methods by which the magnetic field itself may be generated. For example, an electro-magnet could be substituted for the fixed or permanent type horseshoe magnet. Additionally, the use of spacer blocks such as 46 and 47 is an optional feature and is required only as the height or dimensional requirements of a particular system require. For convenience, it has been found desirable to provide a wear surface so that the pole pieces 43 and 44 themselves are not worn by the rubbing motion of the silent chain 16. To this end, a wear plate 48 is placed atop the pole pieces 43 and 44. The silent chain 16 actually rides on the upper most surface of the wear plate 48. It should be evident that because of the relatively high forces involved in pulling the silent chain 16 down onto the wear plate 48, the wear plate 48 should be of a hard material which will resist wear for as long as possible. The wear plate 48 should be of a basically non-magnetic material such as stainless steel to prevent distortion of the magnetic field applied to the chain 16. The pole pieces, spacer blocks and wear plate could be assembled as a unit in any desired manner, for example bolts or screws may be used to hold the wear plate 48 to the pole pieces 43 and 44 to allow easy removal of the wear plate 48.

Figure 3:
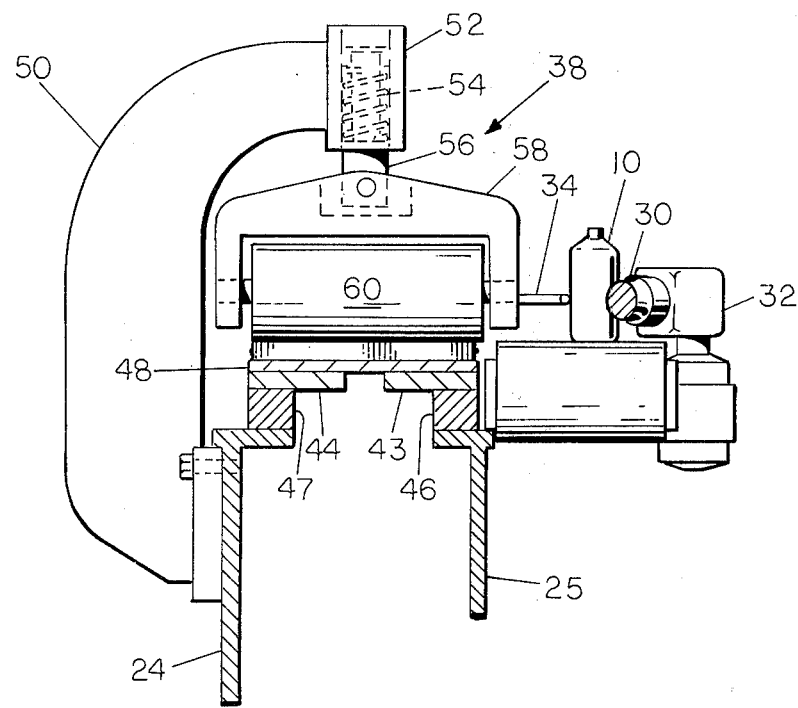
FIG. 3 is a cross sectional view taken along the line 3—3 of FIG. 1.

FIG. 3 illustrates in more detail the configuration of the force applying means 38. A generally L-shaped bracket 50 is bolted to the side member 24 and extends upwardly and over the silent chain 16. The upper end of the bracket 50 carries a force applying head 52 which extends over the chain 16. In this particular illustration, the force applying head 52 has an internal spring 54 which presents a downward load on an extending shaft 56. A fluid motor such as an air cylinder could replace the force applying head 52 and spring 54, since all that is required is some means for applying a downward force to a U-shaped support arm 58 which is pivotally mounted to the end of the shaft 56. A hold down roller 60 is rotatably mounted in the support arm 58. It should be quite clear that the force applied to the roller 60 will press the chain 16 down against the wear plate 48 and hold it flat until the magnetic forces presented by the pole pieces 43 and 44 can hold the chain completely flat against the wear plate 48.

Figure 4:
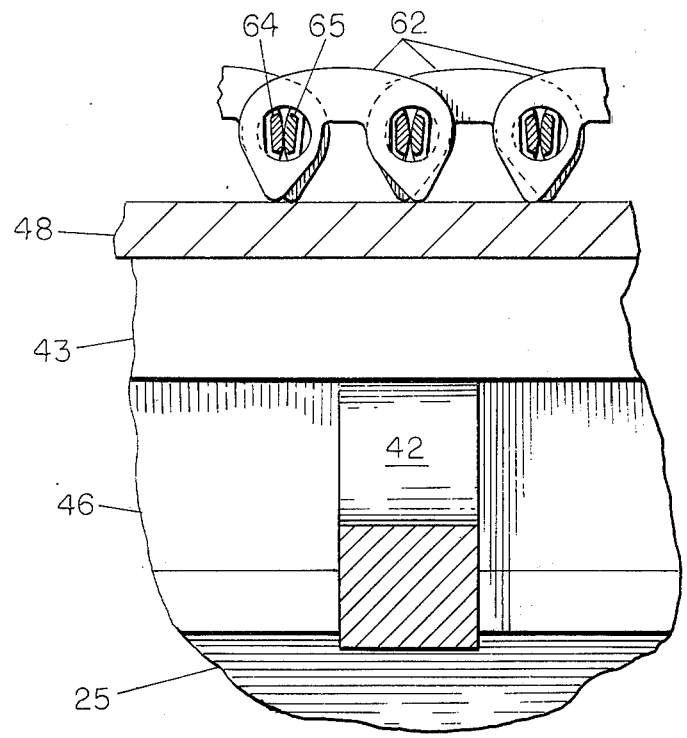
FIG. 4 is a cross sectional view taken along the line 4—4 of FIG. 2.

The question may arise as to possible dimensional distortion from side to side in the chain 16 with the roller 60 presenting a constant force across the entire width of the chain. It has previously been noted that the chain 16 is specifically made with gaps in the inner width portion of it to allow the links in this area to float up and down relative to the outside links. However, the chain links themselves are all ground on their tops and bottoms so that they are parallel to one another and may be pressed down against a flat surface. The dimensional distortion in the chain 16 actually takes place as a result of variation in the pins which hold the chain 16 together. These pins are relatively long, thin members which are hardened, and therefore are extremely difficult to hold to a precise degree of straightness. Therefore, in a common silent chain, there can be appreciable height variation from side to side of the chain. Therefore, if the pins are cut slightly under sized in the center of the chain, the links in this area are free to find the elevation to which they are forced. In this particular case, all of the links in the chain forced to an elevation determined by the bottom of the roller 60 and the top of the wear plate 48. FIG. 4 illustrates in somewhat more detail precisely how the chain 16 is assembled. Note that there are a plurality of individual links 62 which are all substantially identical. These links are tied to one another by two pins 64 and 65 which extend through them. The precise relationship of these pins to the links 62 will be discussed in more detail in the following drawing figures. However, FIG. 4 quite clearly shows that the bottom most portion of the links 62 is held in position against the top of the wear plate 48 by the magnetic forces exerted by the magnets 42 through the pole pieces 43 and 44.

Figure 5:
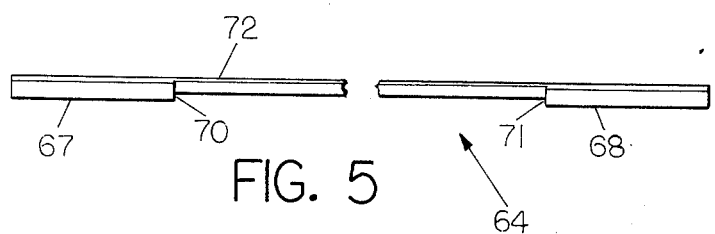
FIG. 5 is a top, plan view of one of the assembly pins of the present invention.
Figure 7:
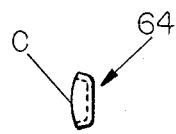
FIG. 7 is an end view of one of the assembly pins of the present invention.
Figure 6:
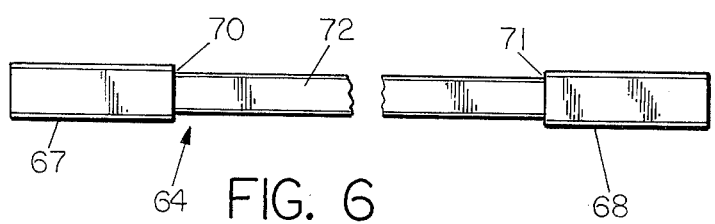
FIG. 6 is a side, elevation view of one of the assembly pins of the present invention.

FIGS. 5, 6 and 7 illustrate three views of a typical one of the pins 64 which hold the chain 16 together showing how these pins are modified to allow operation in the mode described. The pin 64 is machined to allow two end pieces 67 and 68 to remain. The end pieces 67 and 68 are of the original size of the entire pin 64 and would therefore be the size of the pin in normal use. However, a slot is machined along the length of the pin 64 to define offset areas 70 and 71 which are then connected by a stringer 72. The view of FIG. 6 illustrates that an offset is also provided at the top and the bottom of the the pin 64. The offsets at the top and the bottom allow any links 62 which are connected to float either up or down depending upon their needs. The offsets 70 and 71 allow any back and forth play that may be necessary in between two pins 64 and 65 engaged in any single link 62. Note that it is necessary to machine only one side of the pin 64. This is so because, as seen in FIG. 7, one face of the pin 64, designated as C, is a curved face on which the two pins meet and ride. Since these two faces C are curved, two pins 64 and 65 may ride on one another in a cam like action and thus do not have to have a relief cut on this face. By way of one example, the pins 64 and 65 and the chain 16 specifically illustrated herein are of the type manufactured by the Ramsay Products Corporation of Charlotte, N.C. In one specific case, the entire chain was approximately 6⅛ inches wide, with the center stringer section 72 being approximately 4¾ inches long. The recessed portion formed in the curved face C was between fifteen-thousandths and twenty-thousandths of an inch. This would be the depth of the recesses 70 and 71. The other offsets of the stringer 72 would both be between fifteen and twenty-thousandths of an inch.

Figure 8:
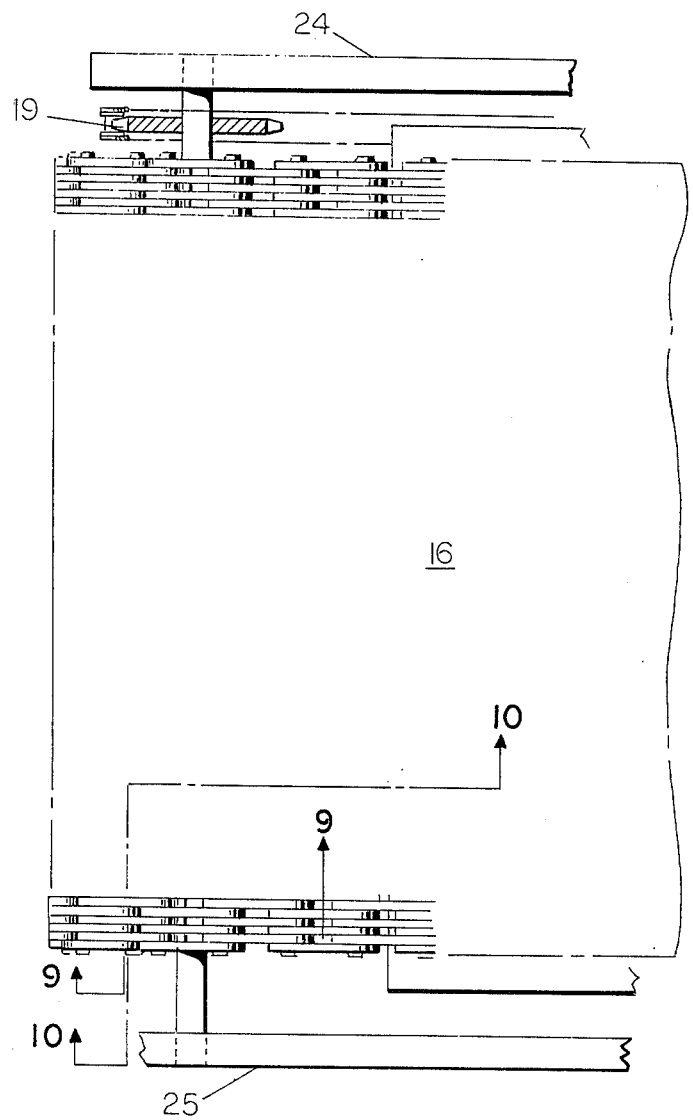
FIG. 8 is a top plan view of a portion of the end of the silent chain conveyor of the present invention.
Figure 9:
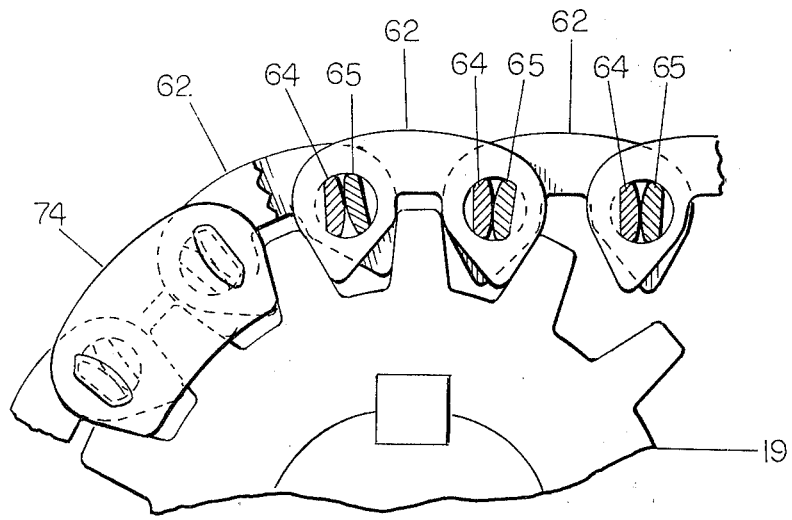
FIG. 9 is a partial cross sectional view taken generally along the line 9—9 of FIG. 8.
Figure 10:
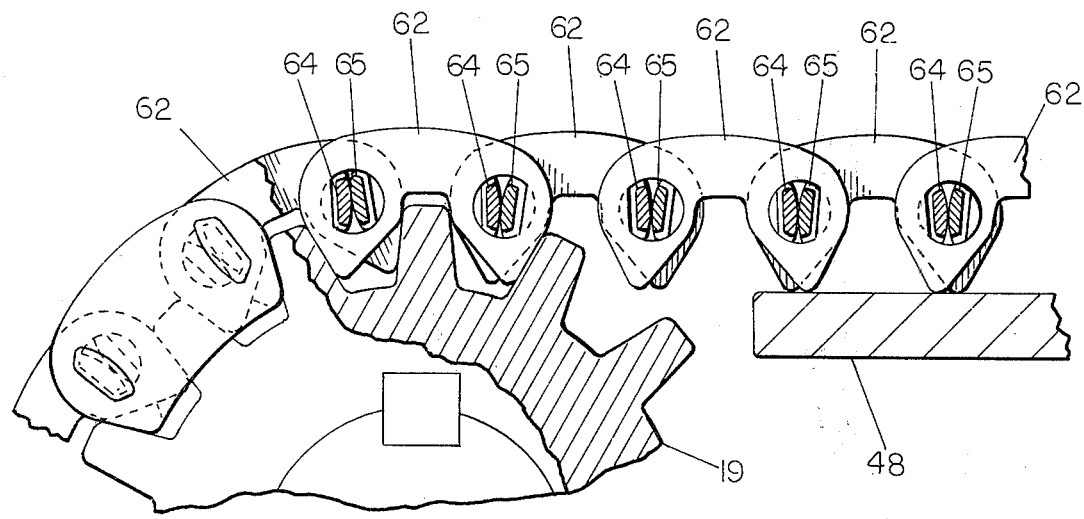
FIG. 10 is a partial cross sectional view taken generally along the line 10—10 of FIG. 8.

FIG. 8 is a top view of the end most portion of the entire transport system 14 and is included generally for orientation purposes to allow the visualization of the precise areas which FIGS. 9 and 10 illustrate. FIG. 9 shows engagement of the links 62 with the driven sprocket 19. Note that the chain 16 is actually completed by an outside link 74 which secures the pins in place. One of the pins 64 or 65 is slightly longer than the other one of the two pins and extends to the outside link 74. This is generally common practice and such pin is then peened over to be held in place by the outside link 74 or in some cases is held in place with a cotter pin. Whatever the case, FIG. 9 clearly illustrates that the outside links 62 which engage the sprocket 19 exhibit the classic motion desired for a silent chain. Namely, the pins 64 and 65 have their curved faces C in contact and are allowed to rock relative to one another thus diminishing to a great extent any chordal action occurring during this movement around the sprocket 19. Note very carefully that the links 62 shown in FIG. 9 are those links which are in contact with the sprocket 19 on its outer most periphery and are those links which are specifically left in an unchanged condition to carry the load of the entire system. Only one outside link 74 is shown in FIG. 9 with the others having obviously been removed for clarity of explanation. FIG. 10, conversely, is a view which is taken somewhat inside the width of the chain 16 and illustrates very clearly that the links 62 which have had their pins 64 and 65 modified as shown in FIGS. 5, 6 and 7 are clearly freely to float or move relative to the pins 64 and 65 which hold them together. Some of these links 62 are shown as being in engagement with the sprocket 19, but these have no particular contribution to the driving force, since they are relatively free to move with respect to the pins. This being the case, there is not necessarily any transfer of driving force from the pins to the links, or more properly from the links to the pins. It is quite apparent from FIG. 10 that the links 62 in the center most portion of the chain 16 are free to move relative to their pins 64 and 65 which hold them together. It should be realized that the configuration shown in FIG. 10 could equally well represent the condition where the openings in the links 62 are made slightly oversized. The same general effect could be obtained if special links 62 were made whose openings were slightly larger than the nominal diameter of the pins 64 and 65 which hold the chain together. In such case, the appearance of the chain 16 itself would be identical to that as seen in FIGS. 9 and 10. In particular, since FIG. 10 shows clearance between the pins 64 and 65 and the holes in the links 62 through which they are inserted, it should be quite apparent that this would be the identical appearance if the holes in the links themselves were made slightly oversized relative to the pins. The same net effect would be obtained because the pins 64 and 65 would not be able to control the elevation of the links 62. The links 62 would still be relatively free floating.

I claim:

1. Apparatus for providing a dimensionally stable, moving platform for the inspection of articles being moved by said apparatus which comprises, in combination:

a modified, endless silent chain of the type having a plurality of transverse and longitudinal links, said silent chain being held together as a unit by a plurality of pairs of pins extending transversely through a common opening in said links to hold adjacent links together, said chain being modified to allow vertical and longitudinal movement of a center group of said links relative to said pins while the outermost of said links are in fixed positional contact with said pins;

at least two rotatably mounted, longitudinally spaced apart sprockets over which said endless silent chain is trained;

means for driving one of said sprockets;

magnetic force applying means, positioned under said silent chain between said sprockets, for holding said center group of said links in common horizontal and vertical planes; and mechanical force applying means positioned adjacent said silent chain in the area where said magnetic force applying means begins, for pressing said silent chain downward to insure that all of said center group of said links are held by said magnetic force applying means.

2. The apparatus of claim 1, wherein said pins have one curved face and one flat face, said pins being assembled with said curved faces in contact with one another, and wherein said pins have a first slot cut in said flat face and slots above and below said first slots, said slots defining two end pieces connected by a stringer portion.

3. The apparatus of claim 2, wherein said stringer portion passes through said center group of said links and said outermost ones of said links are in engagement with said end pieces.

4. The apparatus of claim 1, where in said mechanical force applying means includes:

a bracket having a portion extending over said silent chain;

a force applying unit carried by said portion extending over said silent chain;

an extending shaft which has a downwardly directed force applied thereto by said force applying unit;

a support arm carried by said shaft; and a roller, in contact with said silent chain, rotatably mounted in said support arm, said roller applying a mechanical force to said silent chain to hold it in contact with said magnetic force applying means.

5. The apparatus of claim 1, wherein said magnetic force applying means includes:

at least two transversely spaced apart pole pieces, positioned under said silent chain and extending longitudinally through an inspection zone; and means for providing a magnetic field to said pole pieces sufficient to hold down said silent chain in said inspection zone.

6. The apparatus of claim 5, which further includes a wear plate, positioned above said pole pieces, on which said silent chain rests during its movement.

7. The apparatus of claim 5, wherein said means for providing a magnetic field includes a plurality of longitudinally spaced apart permanent magnets having north and south poles, said north poles being in contact with one of said pole pieces and said south poles being in contact with the other of said pole pieces.

* * * * *